United States Patent [19]

Konno et al.

[11] Patent Number: 4,699,486
[45] Date of Patent: Oct. 13, 1987

[54] CAMERA WITH OPENABLE AND CLOSABLE GRIP

[75] Inventors: Tatsuo Konno; Yoshiaki Sugiyama; Jun Terashima; Masayoshi Kiuchi, all of Kanagawa, Japan

[73] Assignee: Canon Kabushiki Kaisha, Japan

[21] Appl. No.: 783,848

[22] Filed: Oct. 3, 1985

[30] Foreign Application Priority Data

Oct. 5, 1984 [JP] Japan ............................ 59-151546[U]
Oct. 5, 1984 [JP] Japan ............................ 59-151547[U]
Dec. 28, 1984 [JP] Japan ............................ 59-197489[U]

[51] Int. Cl.⁴ ............................................. G03B 17/02
[52] U.S. Cl. ..................................... 354/82; 354/288; 354/293
[58] Field of Search ......................... 354/82, 288, 293; 352/242, 243

[56] References Cited

U.S. PATENT DOCUMENTS

| 2,949,838 | 8/1960 | Skalabrin | 354/293 |
| 3,588,239 | 6/1971 | Hochstein et al. | 352/243 |
| 4,050,796 | 9/1977 | Komine | 352/243 |
| 4,075,642 | 2/1978 | Niggeloh | 354/82 |
| 4,451,130 | 5/1984 | Yan | 354/82 |
| 4,492,444 | 1/1985 | Wolcott | 354/121 |
| 4,493,542 | 1/1985 | Ohmura et al. | 354/288 |

Primary Examiner—A. A. Mathews
Attorney, Agent, or Firm—Toren, McGeady & Associates

[57] ABSTRACT

A structural arrangement for members to be operated for control over varied functions of a camera, such as operation buttons, terminals for connection with accessories, etc. A grip part is openably carried by one side of a camera body. A camera function control arrangement is disposed within the grip.

18 Claims, 11 Drawing Figures

CAMERA WITH OPENABLE AND CLOSABLE GRIP

BACKGROUND OF THE INVENTION

1. Field of the Invention

This invention relates to gripping devices for cameras and more particularly to a palm grip and a structural arrangement for operating members serving to control the functions of a camera.

2. Description of the Prior Art

The accelerated advancement of electronic technology of recent years have resulted in enhanced performance and a salient increase in specified functions of cameras. The character of cameras as electronic apparatuses is becoming stronger. In the meantime, the increase in the number of spcified functions results in an increase in the number of operation members and terminals for connection with accessories. This not only deteriorates the operability of the camera as a picture taking instrument but also hinders formation of an acceptable shape of the camera.

Generally, the operation members are arranged in a position operable with the fingers of the left or right hand of the photographer with the camera held in a photo-taking position. More specifically, they are disposed at the left and right shoulders of the upper lid or around an apron of the camera body in general. Many of the conventional cameras are arranged to dispose the increased number of operation members within the above-stated limited space by reducing the size of these operation members as much as possible. However, miniaturization of these members is detrimental to acceptable operability of the camera. Further, with the many members thus arranged concentrated around the left and right shoulder parts and/or the apron part of the camera body, these members (including switch buttons or the like) are jammed to close to each other. This condition tends to cause operation of the wrong members.

In holding the camera in a photo-taking posture, irrespective as to whether it is a single-lens reflex camera or a lens shutter camera, the right hand of the camera operator generally takes hold of the camera with the index finger applied to a shutter release button, the thumb to the back lid and other fingers to the front surface of the camera. It goes without saying that, in order to avoid a blurred picture due to shaking of the camera, a stable hold on the camera is most important. Hence, with the camera regarded as a photo-taking instrument, it demands due consideration in terms of human engineering.

It is a recent tendency to arrange a raised part (a grip) on the front side of the camera to provide a finger holding part there. This arrangement is now enjoying an established popularity. In addition to that arrangement, there have appeared some cameras that are arranged to prevent slippage of the thumb by applying a rubber material or the like to the back lid surface of the camera. The holdability of the camera for the right hand thus has been improved to a certain degree.

However, a hand consists of not only fingers but also a palm, which occupies at least one half of the hand and plays an important role in the performance of varied functions of the hand. However, the conventional camera bodies have paid entirely no heed or little heed to that important role of the palm. For example, an uncertain feeling has often been caused by the void space left at the palm part or by some protrusion such as the hinge part of the back lid of the camera.

SUMMARY OF THE INVENTION

A first object of this invention is to provide a structural arrangement for improvement in the right hand holdability of a camera body in holding a camera in a photo-taking posture.

A second object of this invention is to improve the operability of a camera.

These and further objects and features of the invention will become apparent from the following detailed description of preferred embodiments thereof taken in connection with the accompanying drawings.

BRIEF DESCRIPTION OF THE DRAWINGS

FIG. 1 is a plan view showing the upper side of the camera.

FIG. 2 is a plan view showing essential parts of the upper side of the same camera with a palm grip part closed.

FIG. 3 is a plan view showing the essential parts of the upper side of the camera with a back lid opened.

FIG. 4 is a side view showing the right side of the camera.

FIG. 5 is a right side view of the same camera showing it with the palm grip part opened.

FIG. 6 is an oblique view showing the palm grip part in an open state.

FIG. 7 is a plan view showing essential parts on the upper side of the camera.

FIG. 8 is a plan view showing a portion of the upper side of the camera with a palm grip part in an open state.

FIG. 9 is a plan view showing the same portion of the upper side of the camera with the back lid thereof in an open state.

DETAILED DESCRIPTION OF THE PREFERRED EMBODIMENTS

Figure 1:
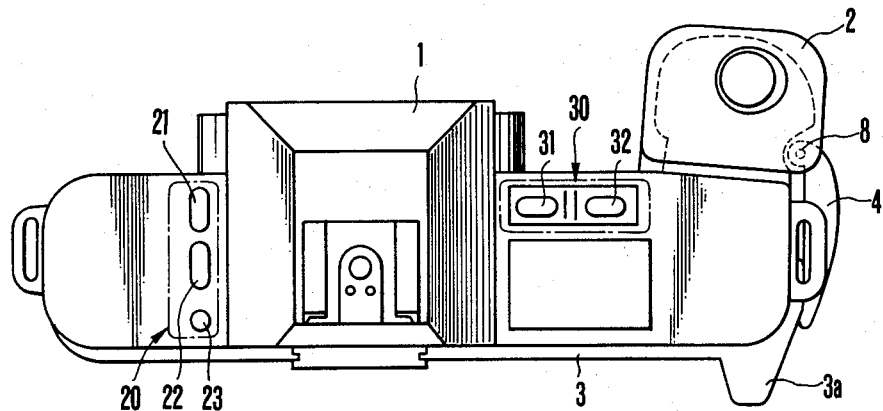
FIGS. 1 to 6 show a camera arranged according to this invention as a first embidiment thereof.

A first embodiment of this invention is as shown in FIGS. 1 to 6. These illustrations include a camera body 1 and grip 2 which is formed to protrude from the front of the camera body on the right-hand side thereof as viewed on FIG. 1. A soft material 2a such as rubber is applied to cover the surface of this grip 2. A back lid 3 is pivotally carried on the right-hand side of the camera by a back lid shaft 3c and is turnable thereon to open and close. The back lid 3 is provided with a finger hold 3a which is arranged for the thumb of a right hand to be used in holding the camera on the right-hand side thereof with the right hand. There is provided a palm grip 4 which will be described later herein. A recess 3b is formed in the back lid 3 in a position opposed to the opening end of the palm grip 4 and is arranged to facilitate insertion of a finger. The palm grip 4 is arranged to almost completely cover the right side of the camera body 1 (as viewed on FIG. 1). This grip 4 is formed in a moderately curved shape on the outside for the purpose of enabling the palm of hand to come tightly in contact therewith to enhance the holdability of the camera. Meanwhile, a recess 4a is formed inside of the palm grip 4 to house therein the back lid shaft 3c and the protrudent arrangement of control buttons, etc. disposed within a first arrangement area 5 provided for control over the functions of the camera on the right-hand side. The palm grip 4 is pivotally carried to be openable and closable by a rotative shaft 8 disposed on the front side of the camera. One end of the palm grip is arranged to be locked by the camera body 1 while the other end of the palm grip 4 is urged to close by a coiled spring 7 which is arranged within the recess 4a of the palm grip.

In the shoulder part on the left-hand side (as viewed on FIG. 1) of the upper surface of the camera, there is provided a second arrangement area for control over the functions of the camera. Three camera control buttons 21, 22 and 23 are disposed within this area 20. In another shoulder part on the right-hand side of the upper surface of the camera, there is provided a third arrangement area 30 for control over the functions of the camera. Two camera control buttons 31 and 32 are disposed within the area 30.

The details of the camera function control arrangement disposed in the above-stated first camera function control arrangement area 5 of the right side of the camera body 1 (as viewed on FIG. 1) are as follows: The arrangement of this area 5 includes a battery check operation button 10; a view finder display illuminatinn operation button 11; a rotary switch 12 for ON and OFF switching operations on a display to be made within the view finder; and a remote terminal 13. In other words, a switch which is not frequently used, and a switch which, if erroneously operated, would bring about a seriously adverse effect and a terminal which is highly vulnerable to dust or the like are placed within the area 5. With the palm grip 4 in a closed state, they can be effectively protected from an erroneous operation, dust, etc.

Meanwhile, the buttons 21, 22, 23, 31 and 32 which are disposed in the second and third camera function control arrangement areas 20 and 30 are provided for switches which are to be frequently used. For example, they include switches for ISO film sensitivity selection, shutter time selection, aperture value selection, etc.

Figure 4:
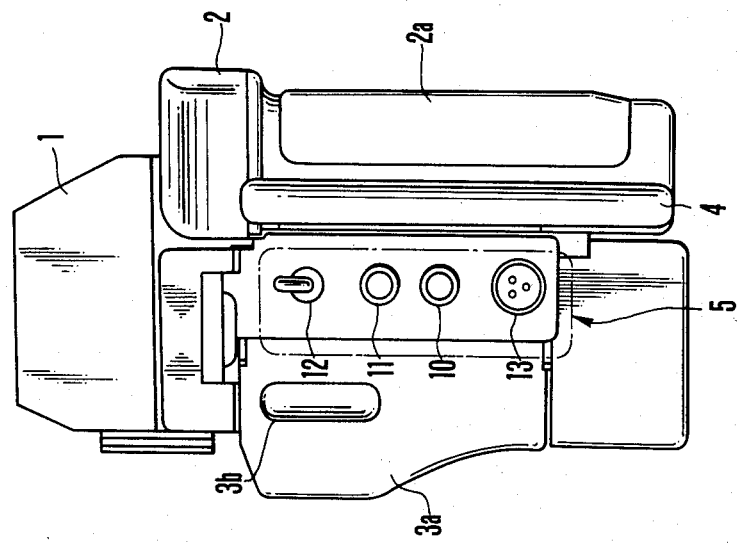

The function and the operation of the palm grip 4 are as follows: In the closed state as shown in FIGS. 1 and 4, the palm grip 4 permits tight contact of the palm while the camera body 1 is being held by the right hand of the operator so that the holdability of the camera is greatly enhanced. The provision of this palm grip solves problems, such as a blurred picture due to vibrations of the hand, a space between the camera body and the palm and the protrusion of a back lid shaft. In addition to that advantage, the palm grip 4, when closed, effectively prevents the various operation parts 10 to 13 arranged in the first camera function control arrangement area 5 from being affected by erroneous or inadvertent operations and intrusion of dust or a foreign matter.

Figure 2:
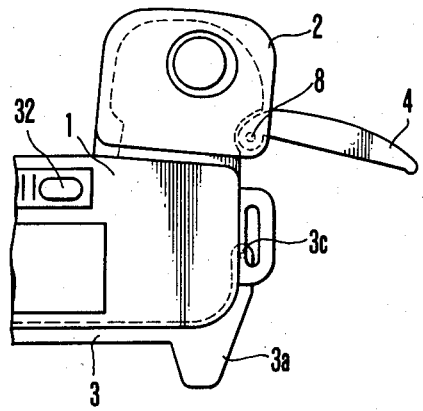
Figure 5:
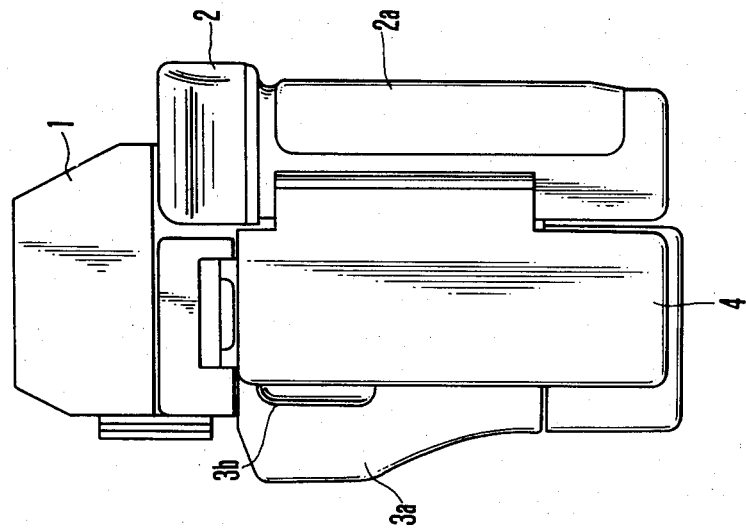
Figure 6:
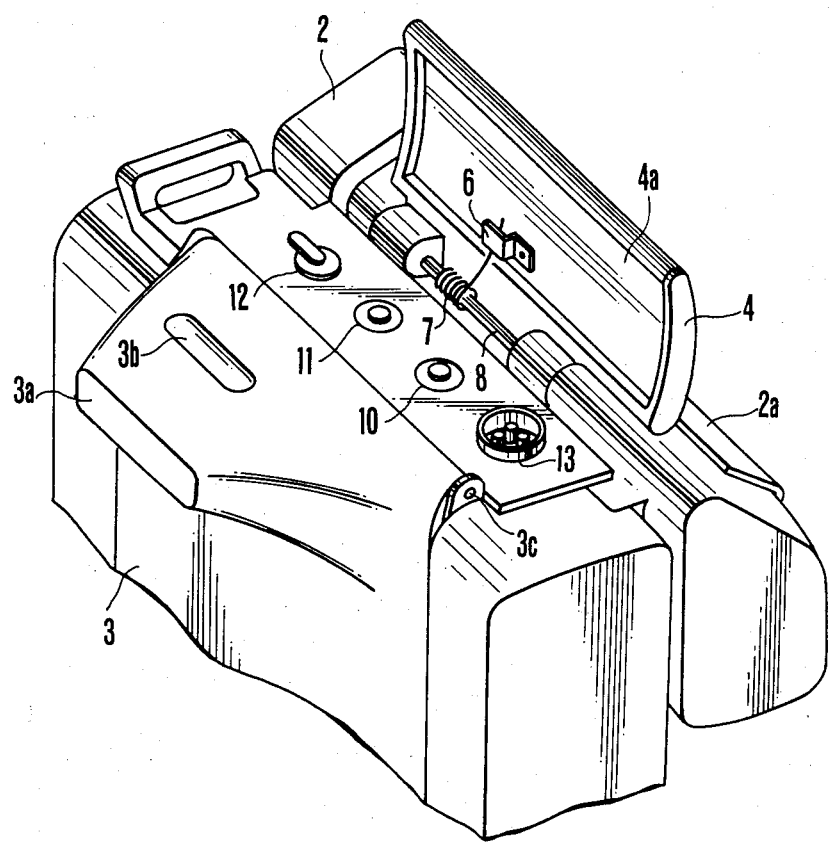

When the palm grip 4 is in an open state as shown in FIGS. 2, 5 and 6, the parts 10 to 13 disposed in the area 5 are operable.

Figure 3:
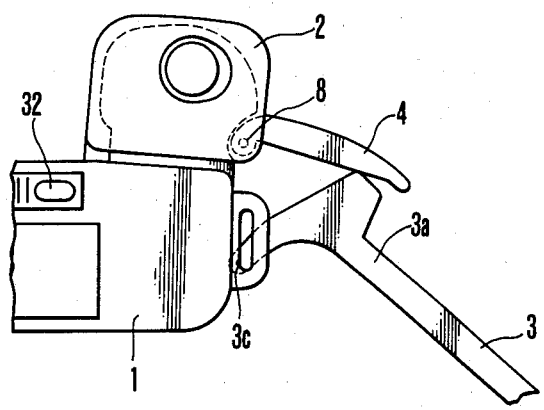

When the back lid 3 is opened as shown in FIG. 3, the palm grip 4 which is covering the back lid shaft part 3c is also opened accordingly as the back lid 3 opens. In this instance, as shown in the drawings, the back lid 3 can be opened to a great degree in the same manner as in the case of the conventional camera having no palm grip 4. Therefore, a film loading operation, etc. can be performed without hindrance. When the back lid 3 is closed, the palm grip 4 is automatically brought back to the closed state by the urging force of the coiled spring 7. Therefore, the palm grip 4 does not require any closing operation when the back lid 3 is closed.

In this embodiment, a total of eight operation switches 10, 11, 12, 21, 22, 23, 31 and 32 are arranged in the first, second and third camera function control arrangement areas on the camera body 1. If all these switches are to be arranged in the available spaces of the two shoulder parts on the upper side of the camera, they must have smaller operation areas within these limited spaces. Whereas, in accordance with the arrangement of this invention, they can be arranged to have relatively large operation areas as those of the operation switches 10, 11, 12, . . . of this embodiment. This is a great advantage of the invention.

Figure 7:
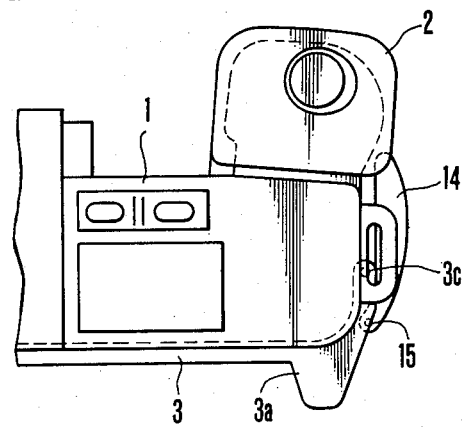
FIGS. 7 to 9 show a camera arranged as second embodiment of this invention.
Figure 8:
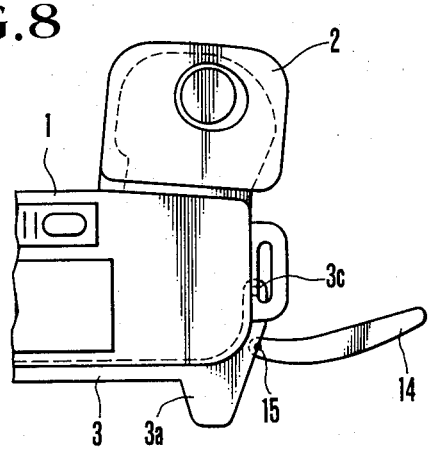
Figure 9:
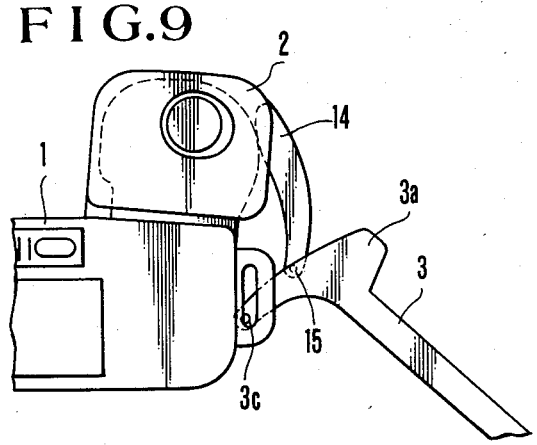

FIGS. 7, 8 and 9 show another camera as a second embodiment of this invention. In this case, the palm grip is arranged to be pivotally carried by the back lid of the camera instead of by the camera body as in the case of the first embodiment. With the exception of that point, the rest of the arrangement of this embodiment is similar to the first embodiment and thus requires no further description. In the following description the same reference numerals are used as in the case of the first embodiment.

The palm grip 14 of the second embodiment is pivotally carried by a hinge shaft 15. The palm grip 14 is thus arranged on the right-hand side of the back lid 3 (as viewed on FIG. 7) in the neighborhood of the back lid shaft 3c to be turnable on the shaft 15 to open and close. With this palm grip 14 closed, it enhances the holdablility of the camera when the camera is held by the right hand of the operator in the same manner as in the case of the first embodiment. When the palm grip 14 is opened as shown in FIG. 8, the camera control button 10 can be operated. When the back lid 3 is opened as shown in FIG. 9, the palm grip 14 is opened together with the back lid 3 according as the position of the shaft 15 changes. As shown, the back lid 3 can be opened through a wide angle in the same manner as in the case of the conventional camera having no palm grip 14, so that a film loading operation, etc. can be performed without hindrance.

In both the first and second embodiments, the palm grip 4 or 14 is formed separately from the camera body 1 to permit replacement work thereon by just removing the pivotally carrying part. The outside shape of the palm grip, therefore, can be selected according to the personal condition of the operator.

Figure 10:
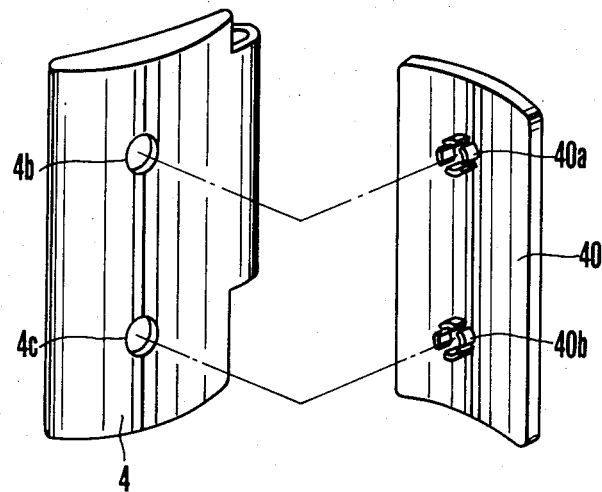
FIG. 10 is an oblique view showing the essential parts of a third embodiment of this invention.

FIG. 10 shows a third embodiment of this invention. In this embodiment, the palm grip 4 is characterized in that a thickness correction (or adjustment) plate 40 is attached to the palm grip. The shape of this thickness correction plate 40 is as shown in FIG. 10. The inner side of the thickness correction plate 40 on which it is to be attached to the palm grip is formed in a curved shape which coincides with the curved shape of the outside of the palm grip 4. This shape permits the plate 40 to be in tight contact with the palm grip. The thickness of the palm grip 4 is adjustable by selecting such thickness of the correction plate that best suits the hand of the operator among varied thickness values. The size of hands of people varies. An unadjustable size of the palm grip is not suitable for everybody. In view of this, the palm grip 4 in this specific embodiment is arranged to have its thickness adjustable to suit everybody by means of the thickness correction (adjustment) plate 40. Hence the thickness correction plate 40 is arranged to be shaped in varied manners. In a first manner, the plate is prepared merely in varied thicknesses. In a second manner, it is prepared to have different thicknesses in its different areas. In other words, the thickness in one area of the plate is arranged to differ from that of another area; or a plurality of plates 40 are arranged to have different configurations of raised and recessed parts.

Further, the thickness correction plate 40 is arranged to be attachable and detachable to and from the palm grip 4. More specifically, as shown in FIG. 10, two roughly cylindrical projections 40a and 40b are provided on the inner side of the thickness correction plate 40. Each of these projections 40a and 40b consists of four elastic claws. Meanwhile, in the outside of the palm grip 4 are formed circular holes 4b and 4c which are arranged in positions corresponding to the projections 40a and 40b to have a diameter somewhat smaller than the diameter of the projections 40a and 40b. The thickness correction plate 40 is elastically attached to the palm grip 4 by fitting the projections into the holes. The former is of course detachable without difficulty from the latter.

Figure 11:
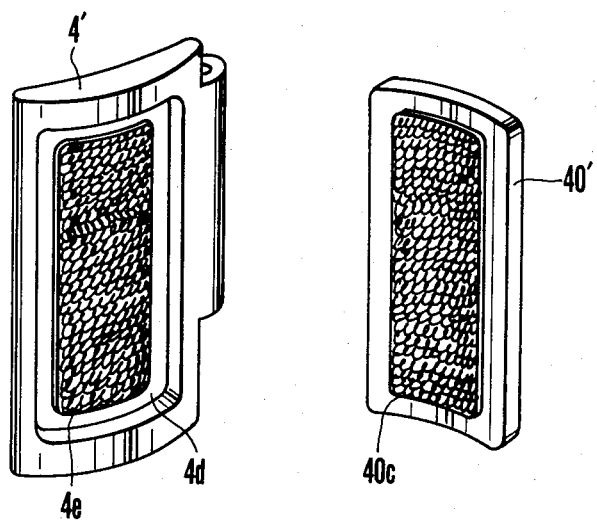
FIG. 11 is an oblique view showing the essential parts of a fourth embodiment of this invention.

FIG. 11 shows a grip arrangement of a camera as a fourth embodiment of this invention. A recessed part 4d is formed on the outside of a palm grip 4' and is arranged to receive a thickness correction (adjustment) plate 40'. Sticking tapes 4e and 40c are attached to the plane part of the recessed part 4d of the palm grip 4' and the inner side of the thickness correction plate 40' respectively. The thickness correction plate 40' is attachable and detachable to and from the palm grip 4' by virtue of these sticking tapes 4e and 40c. Therefore, in the same manner as in the case of the third embodiment, the palm grip 4' is also adjustable to the most suitable thickness.

In the foregoing, two different ways of attaching the thickness correction plate to the palm grip have been described in the third and fourth embodiments of this invention. However, this invention is not limited to these arrangements of attaching and detaching two members to and from each other. The same advantageous effect of this invention is attainable also by some other attaching arrangement. For example, in accordance with this invention, the two members may be attached to each other by screw engagement, snap fit coupling, caulking, a weak adhesive, etc.

In accordance with this invention, a grip is arranged on one side of the camera body to greatly enhance the holdability of the camera. The grip is pivotally arranged to be openable and closable and is arranged to cover a camera function control arrangement disposed on the same side of the camera including operation buttons, etc. Therefore, the grip protects these members from being erroneously operated or from being affected by intrusion of dust or the like. It is another advantage of this invention that the invented arrangement enables other camera function control members to be arranged on the upper side, etc. of the camera body with an ample spatial allowance to ensure improved operability of the camera.

While specific embodiments of the invention have been shown and described in detail to illustrate the application of the inventive principles, it will be understood that the invention may be embodied otherwise without departing from such principles.

What is claimed is:

1. A camera having a camera body with a back lid, comprising:
    (a) a camera function control arrangement disposed on one side part of the camera body; and
    (b) a grip operable to be opened and closed carried by said camera body, said grip being arranged to cover the part in which said camera function control arrangement is disposed when the grip is in the closed state and to expose said camera function control arrangement when the grip is in an open state, said grip being pivotally carried by the back lid of said camera body to be turnable thereon.

2. A grip for a camera having a back lid, comprising: a grip member pivotally carried by a shaft in the neighborhood of a hinge shaft part of the back lid of the camera body and arranged on one side of the camera body to be openable and closable, said grip member being of a sufficient size to cover the surface of said one side of the camera body including the area of the hing shaft part of said back lid, said grip member being pivotally carried by said back lid.

3. A grip according to claim 2, wherein said grip member is pivotally carried by said camera body.

4. A grip according to claim 2, wherein said grip member is pivotally carried by said back lid.

5. A grip according to claim 2, wherein said grip member is urged by a spring to turn in a direction in which said grip closes.

6. A camera including a camera body, comprising:
    (a) a first grip arranged near one of the sides of said camera body and protruding from said camera body in a front-forward direction;
    (b) a camera function control arrangement disposed on a side of the camera on which said grip is arranged, and
    (c) a second grip openably and closably carried by said camera body, said second grip being arranged to cover a part in which said camera function control arrangement is disposed when said second grip is in a closed state and to expose said camera function control arrangement when said second grip is in an open state, and having a contour almost continuous with the contour of said first grip when in said closed state.

7. A camera according to claim 6, wherein said camera function control arrangement includes operation buttons.

8. A camera according to claim 6, wherein said camera function control arrangement includes a rotary switch.

9. A camera according to claim 6, wherein said camera function control arrangement includes a connector for connection with an accessory.

10. A camera according to claim 6, wherein said second grip has the outside thereof formed in a curved shape which enhances the degree of tight contact with the palm of the operator's hand.

11. A camera according to claim 6, wherein said second grip is pivotally carried by the camera body to be turnable thereon.

12. A camera according to claim 6, wherein said second grip is urged by a spring to turn in the direction in which said second grip closes.

13. A camera according to claim 6, further comprising a second camera function control arrangement disposed in a part other than said side of said camera body.

14. A camera according to claim 13, wherein said second camera function control arrangement is disposed in a shoulder part on the upper side of said camera body.

15. A camera according to claim 6, further comprising a thickness correction member arranged to be attachable and detachable to and from said second grip.

16. A grip according to claim 6, wherein said camera body has a back lid openably supported thereon, and said second grip is pivotably carried by said back lid to be turnable thereon.

17. A grip for a camera, including
a camera body, and
a back lid arranged on a back side of said camera body and provided with a hinge shaft for opening and closing arranged near one side of said camera body, said grip comprising
a grip member arranged on the side of said camera body on which said hinge shaft is arranged, said grip member being openably supported by a central shaft almost parallel to said hinge shaft of said back lid so as to cover the area of said hinge shaft when it is in the closed state.

18. A grip of a camera according to claim 17, further comprising a thickness correction member which is attachable to and detachable from said grip member.

* * * * *